(12) United States Patent
Joseph et al.

(10) Patent No.: US 7,513,545 B2
(45) Date of Patent: *Apr. 7, 2009

(54) MOVEABLE GUARD ASSEMBLY FOR ALL TERRAIN VEHICLE

(75) Inventors: Rowdy L. Joseph, Marysville, OH (US); Eric Stevens, Columbus, OH (US)

(73) Assignee: Honda Motor Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/945,824

(22) Filed: Nov. 27, 2007

(65) Prior Publication Data

US 2008/0067825 A1    Mar. 20, 2008

Related U.S. Application Data

(63) Continuation of application No. 11/247,448, filed on Oct. 11, 2005, now Pat. No. 7,325,848.

(51) Int. Cl.
*B60R 9/06* (2006.01)
*B60R 19/38* (2006.01)
*B60K 11/04* (2006.01)
*B60R 19/52* (2006.01)

(52) U.S. Cl. .................. 293/115; 293/118; 180/68.6; 224/488

(58) Field of Classification Search ............ 180/68.6; 224/401, 488, 489, 490, 491, 495, 504, 512, 224/513; 293/115, 116, 117, 118; 296/3, 296/119

See application file for complete search history.

(56) References Cited

U.S. PATENT DOCUMENTS

| | | | |
|---|---|---|---|
| 1,506,274 A | 8/1924 | Specht | |
| 1,522,339 A | 1/1925 | Specht | |
| 1,641,502 A | 9/1927 | Price | |
| 1,779,661 A | 10/1930 | Cleland | |
| 2,789,854 A | 4/1957 | Hope | |
| 3,282,368 A | 11/1966 | Pittera | |
| 3,709,542 A | 1/1973 | Fehlauetal | |
| 3,905,629 A | 9/1975 | Kwong | |
| 4,040,498 A | 8/1977 | Johnson et al. | |
| 4,099,760 A | 7/1978 | Mascotte et al. | |
| 4,277,008 A | 7/1981 | McCleary | |

(Continued)

FOREIGN PATENT DOCUMENTS

| | | |
|---|---|---|
| JP | 4146837 A | 5/1992 |
| WO | WO9401306 A1 | 1/1994 |

*Primary Examiner*—Glenn Dayoan
*Assistant Examiner*—Paul A Chenevert
(74) *Attorney, Agent, or Firm*—Ulmer & Berne LLP (57) ABSTRACT

A moveable guard assembly is configured for installation upon an ATV having a horizontal carrier rack. The movable guard assembly comprises a blocking member and a first securement mechanism. The blocking member is configured for attachment to a front end of the all terrain vehicle in a position adjacent to the horizontal carrier rack. The blocking member is adjustable through movement between a first position in which the blocking member is operable to perform a guard function for protecting at least a portion of the front end of the all terrain vehicle, and a second position in which the blocking member is operable to provide additional support for cargo placed upon the horizontal carrier rack. The first securement mechanism is configured to selectively retain the blocking member in at least one of the first position and the second position. An ATV including the moveable guard assembly is also provided.

14 Claims, 11 Drawing Sheets

U.S. PATENT DOCUMENTS

| | | |
|---|---|---|
| 4,318,501 A | 3/1982 | Graber |
| 4,826,057 A | 5/1989 | Yamada |
| 5,067,760 A | 11/1991 | Moore et al. |
| 5,104,015 A | 4/1992 | Johnson |
| 5,219,106 A | 6/1993 | Glunt |
| 5,236,062 A | 8/1993 | Laney |
| 5,573,162 A | 11/1996 | Spencer et al. |
| 5,595,333 A | 1/1997 | Boston |
| 5,794,976 A | 8/1998 | Stevicks |
| 6,000,594 A | 12/1999 | Chimenti |
| 6,016,943 A | 1/2000 | Johnson et al. |
| 6,296,163 B1 | 10/2001 | Kitao et al. |
| 6,378,748 B1 | 4/2002 | Cox |
| 6,447,032 B1 | 9/2002 | Howell, Sr. |
| 6,461,095 B1 | 10/2002 | Puska |
| 6,638,001 B1 | 10/2003 | McKinley |
| 6,659,566 B2 | 12/2003 | Bombardier |
| 6,732,892 B1 | 5/2004 | Mangrum |
| 7,128,341 B1 | 10/2006 | Dahl et al. |
| 2001/0024042 A1 | 9/2001 | Usui |
| 2002/0070255 A1 | 6/2002 | Hebert et al. |
| 2003/0230607 A1 | 12/2003 | Tweet et al. |
| 2004/0232182 A1 | 11/2004 | Ingram |
| 2006/0120841 A1 * | 6/2006 | Meeks ........................ 414/462 |
| 2007/0080548 A1 | 4/2007 | Joseph et al. |
| 2007/0175937 A1 | 8/2007 | Caldwell |

* cited by examiner

MOVEABLE GUARD ASSEMBLY FOR ALL TERRAIN VEHICLE

CROSS-REFERENCE TO RELATED APPLICATIONS

This application is a continuation of application Ser. No. 11/247,448, filed Oct. 11 2005 now U.S. Pat. No. 7,325,848, the entire disclosure of which is hereby incorporated herein by reference.

TECHNICAL FIELD

The present invention relates to a moveable guard assembly for attachment to the front end of an all terrain vehicle (ATV).

BACKGROUND OF THE INVENTION

It is typical for conventional ATVs to include one or more horizontal carrier racks for supporting cargo upon the ATV. For example, such cargo might include camping equipment, hunting equipment, tools, game and/or any of a variety of other items. In some circumstances, flexible straps can be used to assist in securing such cargo to the horizontal carrier racks. However, appropriate placement and usage of these straps is either impractical or inconvenient for securing at least certain types of cargo to the horizontal carrier racks. It is generally desirable to avoid enlarging and/or otherwise reconfiguring a horizontal carrier rack to better support cargo, as such alterations would likely result in a significant addition of bulk, cost, and/or weight to the ATV, and/or could unacceptably obscure an operator's visibility of approaching terrain. Accordingly, there is a need for a more effective apparatus for assisting in securement of cargo to a horizontal carrier rack on an ATV.

SUMMARY OF THE INVENTION

In accordance with one embodiment of the present invention, an ATV is provided which comprises a carrier rack, a blocking member, and a first securement mechanism. The carrier rack is supported at a location adjacent to a front end of the ATV and defines a substantially horizontal plane configured for supporting cargo thereon The blocking member is provided adjacent to the carrier rack. The blocking member is adjustable through movement between a first position in which the blocking member is operable to perform a guard function for protecting at least a portion of the front end of the ATV, and a second position in which the blocking member is operable to provide additional support for cargo placed upon the carrier rack. The first securement mechanism is configured to selectively retain the blocking member in at least one of the first position and the second position.

In accordance with another embodiment of the present invention, an ATV is provided which comprises a frame, a carrier rack, a blocking member, and a securement mechanism. The carrier rack is attached to the frame adjacent to the front end of the ATV and defines a substantially horizontal plane configured for supporting cargo thereon. The securement mechanism comprises a receptor and a vertical member. The receptor is attached to the frame at a location adjacent to a front end of the ATV. The vertical member is attached to the blocking member and is configured to slidingly interface with the receptor such that the blocking member can be vertically adjusted between a first position in which the blocking member is operative to perform a brush guard function and a second position in which the blocking member is operative to provide additional support for cargo placed upon the carrier rack. The securement mechanism is configured to selectively retain the blocking member in at least one of the first position and the second position.

In accordance with yet another embodiment of the present invention, an ATV is provided which comprises a frame, a carrier rack, a blocking member, and a securement mechanism. The carrier rack is attached to the frame at a location adjacent to a front end of the ATV. The carrier rack defines a substantially horizontal plane configured for supporting cargo thereon. The blocking member is hingedly attached with respect to the carrier rack adjacent to the front end of the ATV. The blocking member is pivotable between a first position in which the blocking member is oriented substantially vertically and is configured to perform a brush guard function, and a second position in which the blocking member is oriented substantially vertically and is configured to provide additional support for cargo placed upon the carrier rack. The securement mechanism is configured to selectively retain the blocking member in at least one of the first position and the second position.

In accordance with still another embodiment of the present invention, a moveable guard assembly is provided for installation upon an ATV, wherein the ATV has a horizontal carrier rack defining a substantially horizontal plane configured for supporting cargo thereon. The movable guard assembly comprises a blocking member and a first securement mechanism. The blocking member is configured for attachment to a front end of an ATV in a position adjacent to a horizontal carrier rack. The blocking member is adjustable through movement between a first position in which the blocking member is operable to perform a guard function for protecting at least a portion of the front end of an ATV, and a second position in which the blocking member is operable to provide additional support for cargo placed upon a horizontal carrier rack. The first securement mechanism is configured to selectively retain the blocking member in at least one of the first position and the second position.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION

The present invention and its operation are hereinafter described in detail in connection with the views and examples of FIGS. 1-8, 9A, and 9B, wherein like numbers indicate the same or corresponding elements throughout the views. These embodiments are shown and described only for purposes of illustrating examples of the elements of the invention, and should not be considered as limiting on alternative structures or assemblies that will be apparent to those of ordinary skill in the art.

An ATV can be provided with a horizontal carrier rack that is fixed in place upon the ATV at a location adjacent to the front end of the ATV. In accordance with the teachings of the present invention, the ATV can further be provided with a guard assembly that is moveable with respect to the horizontal carrier rack. The moveable guard assembly can selectively serve to protect the front of the ATV and to assist in retaining cargo upon the horizontal carrier rack.

Figure 1:
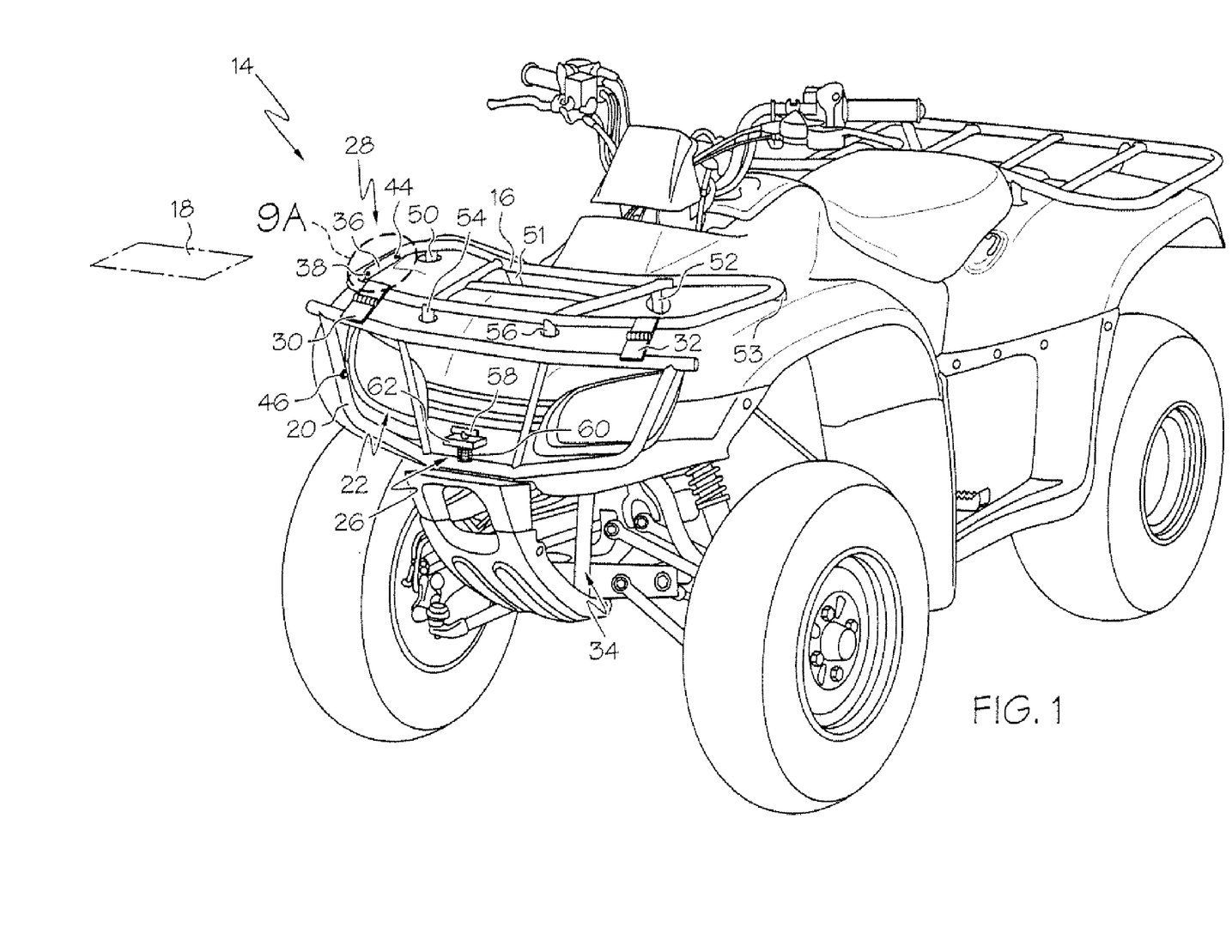
FIG. 1 is a front perspective view of an ATV having a moveable guard assembly in accordance with one embodiment of the present invention, wherein the blocking member is in a first position.

In one particular embodiment of the present invention, as shown for example in FIG. 1, an ATV 14 can be provided with a carrier rack 16 supported adjacent to a front end 22 of the ATV 14. The carrier rack 16 can define a substantially horizontal plane upon which cargo can be placed and supported, whereby this substantially horizontal plane can be coplanar with a plane 18 depicted in FIG. 1. The carrier rack 16 can be secured directly or indirectly to a frame 34 of the ATV 14 in any of a variety of specific configurations. In the particular embodiment depicted in FIG. 1, the carrier rack 16 is shown to be supported by support posts 50, 51, 52, 53, 54 and 56, whereby each of these support posts is directly or indirectly connected with the frame 34 of the ATV 14.

As used herein, the "frame" of an ATV refers to the structural system to which all components of the ATV are directly or indirectly attached. While an ATV's frame is typically formed from steel or aluminum components, it will be appreciated that a frame in accordance with the teachings of the present invention may comprise other types of metal components and/or nonmetal components. Furthermore, a typical frame may comprise metal tubes and/or rails which are welded or otherwise fastened together, although a frame might alternatively comprise a unibody-type configuration formed substantially from bent and welded metal sheets, and/or some other type of construction. It will further be appreciated that an attachment to the frame of an ATV can be direct or indirect, and that an indirect attachment might involve attachment to a body panel, intermediate support structure, or other item, that is attached directly to the frame of the ATV or indirectly (i.e.: through one or more other such components) to the frame of the ATV.

Figure 2:
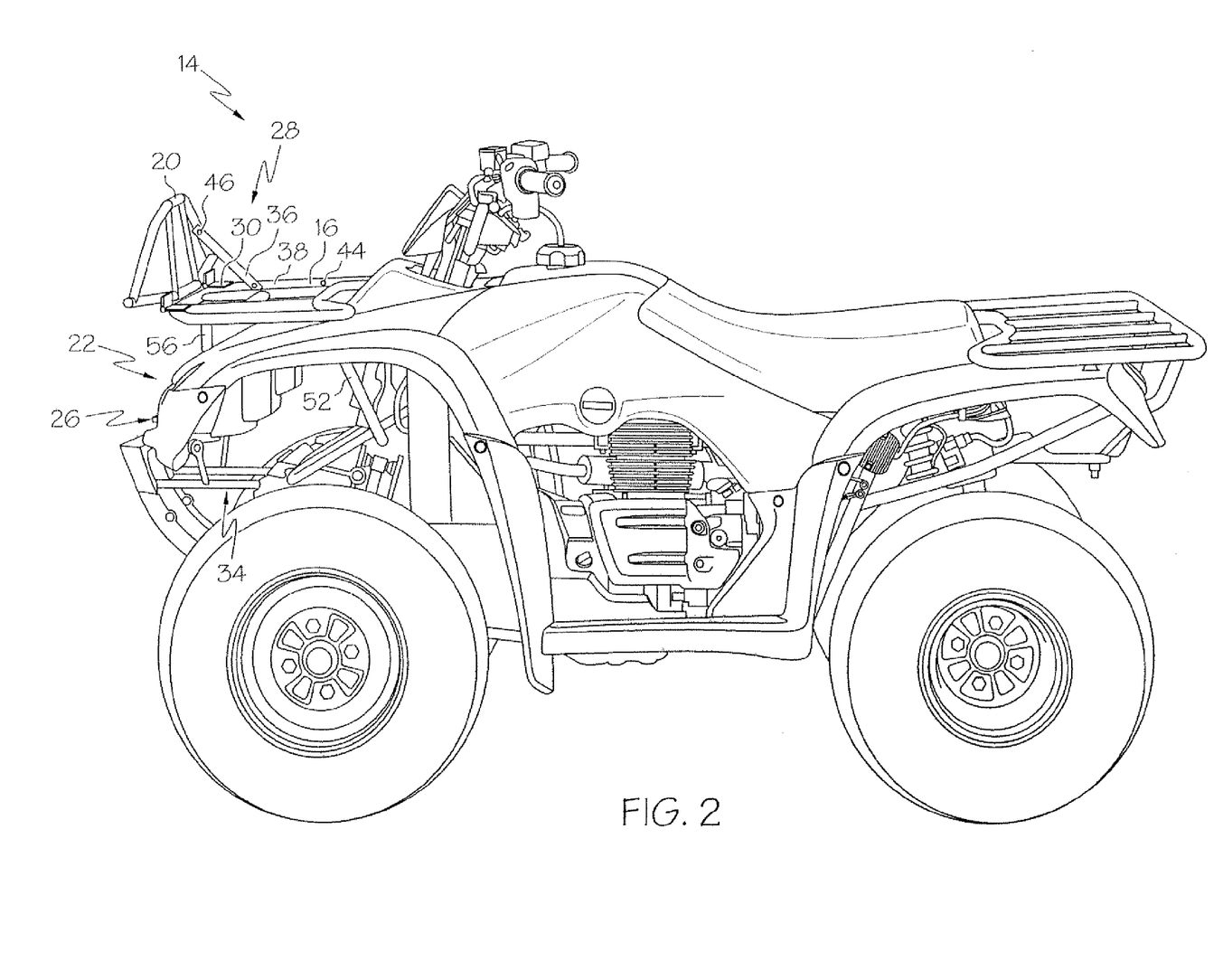
FIG. 2 is a side perspective view of the ATV of FIG. 1 wherein the blocking member is in a second position.
Figure 3:
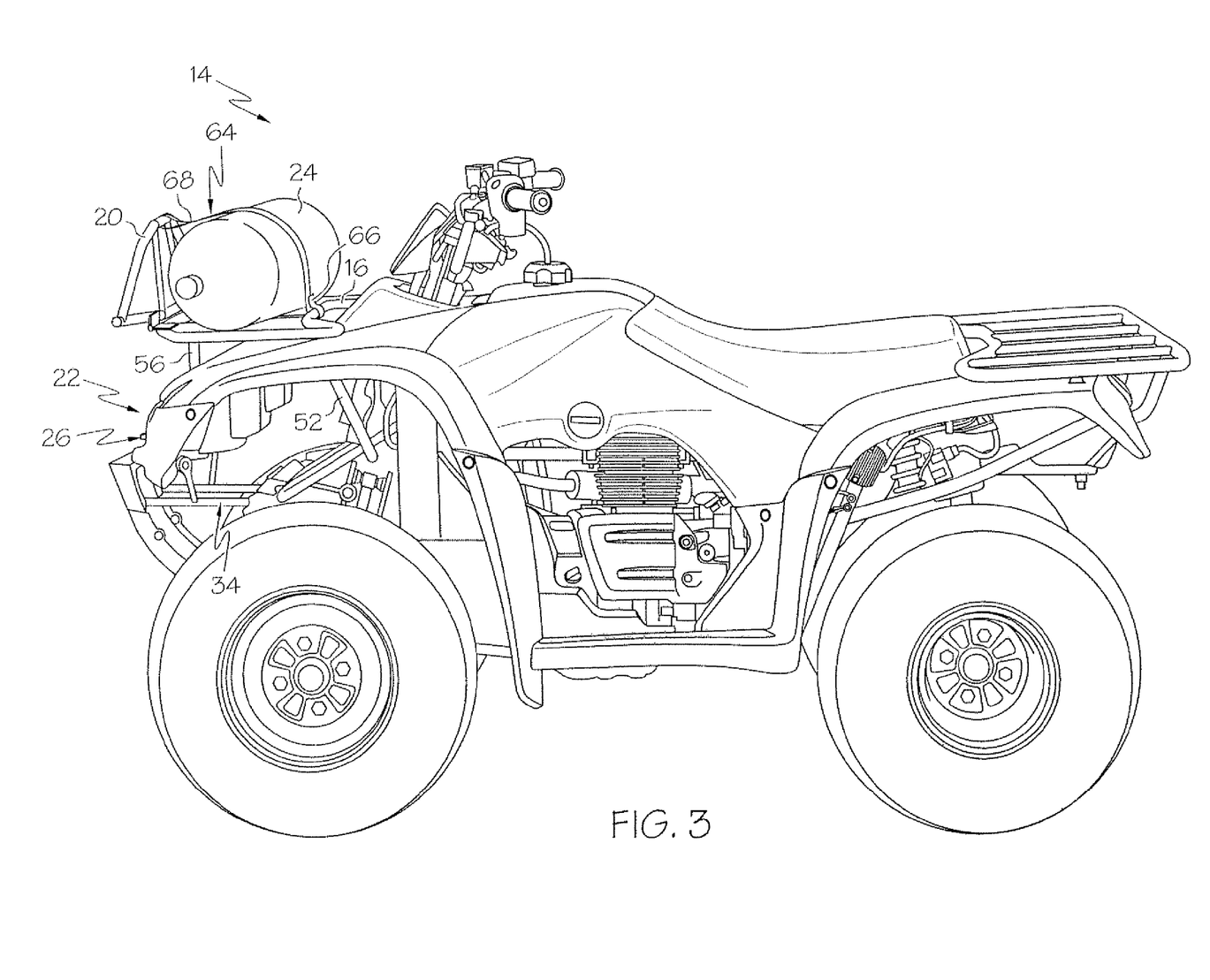
FIG. 3 is a side perspective view of the ATV of FIG. 2 wherein a water bottle is secured to the carrier rack.

The ATV 14 can also be provided with a blocking member 20 which, like the carrier rack 16, can be supported adjacent to a front end 22 of the ATV 14. The blocking member 20 can be provided adjacent to the carrier rack 16 and, in one embodiment, can be directly hingedly attached to the carrier rack 16 with hinges 30 and 32 such that the blocking member 20 is adjustable through movement between a first position and a second position. While in the first position, as shown for example in FIG. 1, the blocking member 20 can perform a guard function for protecting at least a portion of the front end 22 of the ATV 14 such as from brush, debris, and/or collision. In particular, when in the first position, the blocking member 20 can provide what is commonly known as a brush guard function. While in the second position, as shown for example in FIGS. 2-3, the blocking member 20 can provide additional support for cargo placed upon the carrier rack 16, such as by providing a substantially vertical face or wail against which cargo may rest and/or be secured. As shown in FIGS. 1-3, the blocking member 20, when in the first position, can be disposed such that it is substantially beneath the plane 18, and when in the second position, can be disposed such that it is substantially above the plane 18. It will be appreciated that the blocking member 20 can be configured such that it does not obscure an operator's visibility of approaching terrain, at least during which time the blocking member 20 is in the first position. As further shown in FIGS. 1-3, the blocking member 20 can be oriented substantially vertically when in each of the first position and the second position.

One or more securement mechanisms can be provided to selectively retain a blocking member in at least one of the first and second positions. For example, as shown in FIG. 1, a first securement mechanism 26 can be provided to selectively retain the blocking member 20 in the first position, while a second securement mechanism 28 can be provided to selectively retain the blocking member 20 in the second position. The first securement mechanism 26 is shown to include a mount 62, a pin 58 and a spring 60. The pin 58 can be biased by the spring 60 with respect to the mount 62 such that the pin 58 can interact with the blocking member 20 when the blocking member 20 is in the first position, thereby securing the blocking member 20 in the first position. Accordingly, in this configuration, in order that the blocking member 20 can be removed from the first position, the pin 58 can be manually withdrawn against the force of the spring 60, thereby releasing the blocking member 20 from the first position.

After being released from the first position, the blocking member 20 can be pivoted upwardly to the second position. Once pivoted upwardly, the second securement mechanism 28 can be used to retain the blocking member 20 in the second position, as shown for example in FIG. 2. The second securement mechanism 28 is shown to include a strap 36 which can selectively connect the carrier rack 16 to the blocking member 20. The strap 36 can be moveable between a stored position (depicted in FIG. 1) and an extended position (depicted in FIG. 2). The strap 36 can be placed in the stored position when, for example, the blocking member 20 is being retained in the first position by the first securement mechanism 26. However, the strap 36 can be placed in its extended position when, for example, it is desirable for the blocking member 20 to be retained in the second position. When in the extended position, as shown in FIG. 2, the strap 36 can at least assist in maintaining the blocking member 20 in the second position.

Figure 9A:
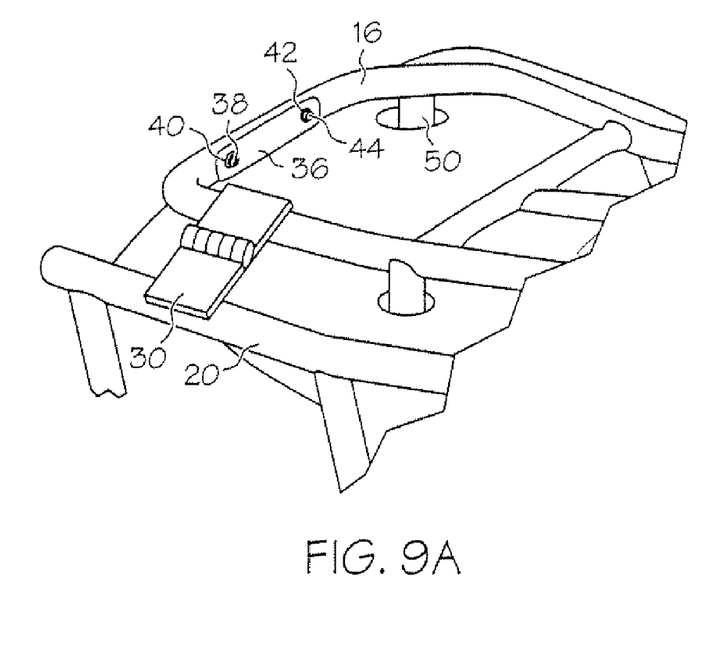
FIG. 9A is an enlarged front perspective view of a portion of the carrier rack and a securement mechanism of FIG. 1.
Figure 9B:
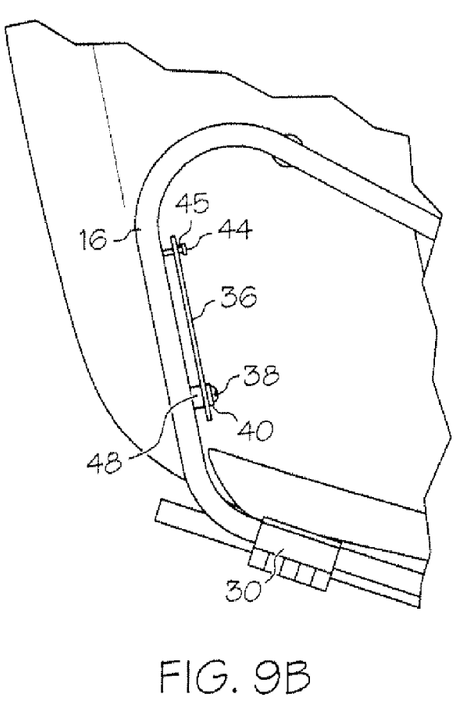
FIG. 9B is a top plan view of a portion of the carrier rack and a securement mechanism of FIG. 1.

FIGS. 9A and 9B provide additional detail with regard to the second securement mechanism 28. The strap 36 can include a first end which is pivotally attached to the carrier rack 16. This attachment can be achieved, for example, through use of a bolt 38 which extends through a washer 40, through an aperture in the strap 36, through a spacer 48, and then into a threaded aperture in the carrier rack 16. The other end of the strap 36 can include an aperture 42 which can selectively slide over a post 44 which is attached to the carrier rack 16. The post 44 can include a hook or notch 45 in order to assist in preventing the end of the strap 36 having the aperture 42 from inadvertently sliding off the post 44. The strap 36 can be placed into its stored position by sliding the aperture 42 over the post 44.

In order to remove the strap 36 from its stored position, the second end of the strap 36 can be moved so as to remove the aperture 42 from the post 44. The second end can then be pivoted and maneuvered until the aperture 42 passes over a post 46 provided upon the blocking member 20, as shown for example in FIG. 2, whereby the strap 36 is in its extended position. The post 46 can include a hook or notch in order to assist in preventing the strap 36 from inadvertently sliding off the post 46. So long as the aperture 42 remains upon the post 46, the strap 36 can maintain the blocking member 20 in the second position.

The strap 36 can be formed from any of a variety of materials such as metal, fiberglass, plastic, rubber, a composite, or some other material. It will be appreciated that in other embodiments of the present invention, a securement mechanism might include multiple such strap/post pairs. It should also be understood that the first and/or second securement mechanisms 26, 28 might be configured differently and/or might even be provided as a single device which can selectively secure the blocking member 20 in the first and second positions (as well as possibly one or more other positions, such as an intermediary position). In fact, a securement mechanism in accordance with the teachings of the present invention can comprise any of a countless variety of alternative mechanical configurations which are operative to selectively retain the blocking member in one or more positions.

Figure 10:
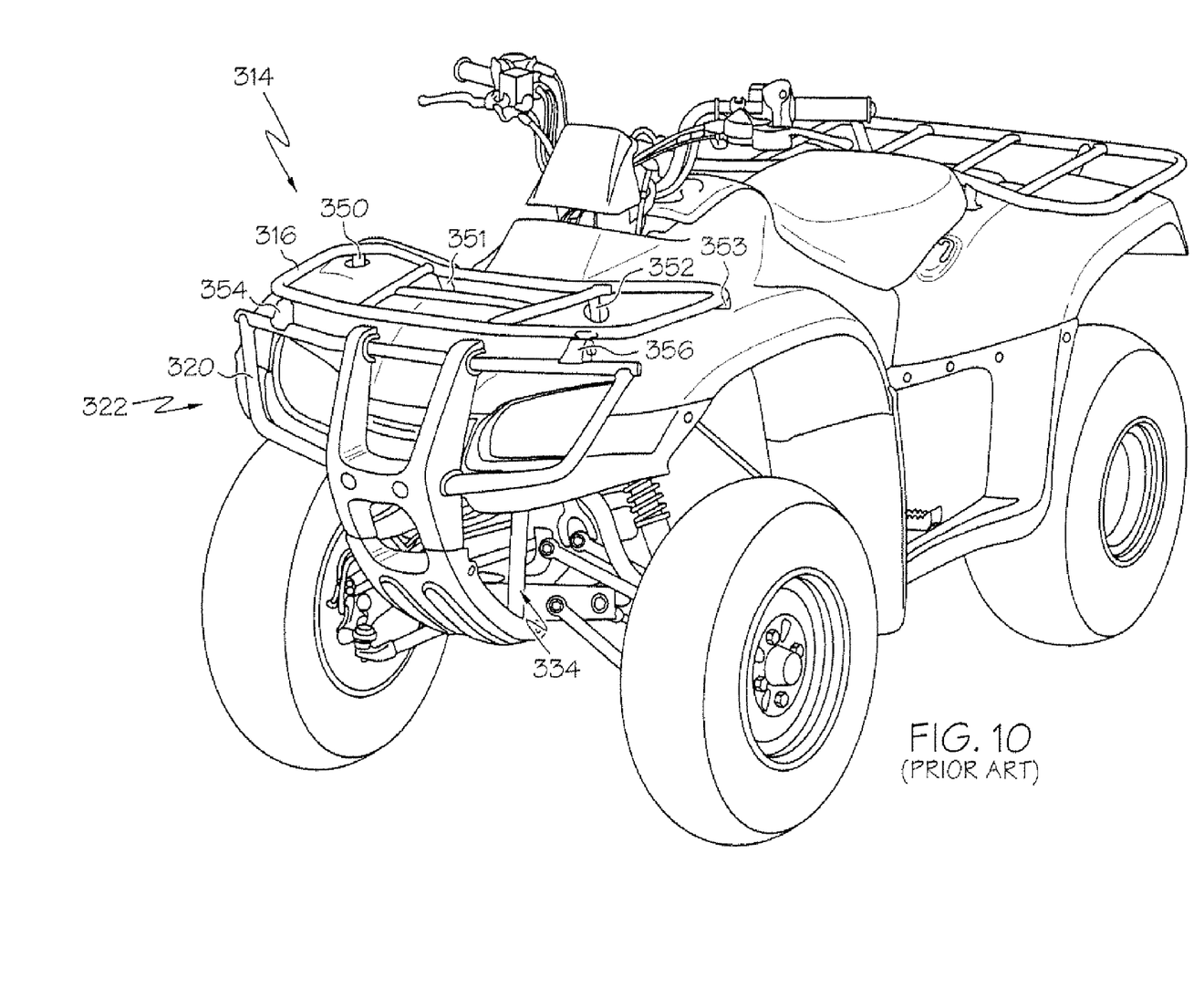
FIG. 10 is a front perspective view depicting a conventional ATV having a carrier rack and brush guard.
Figure 11:
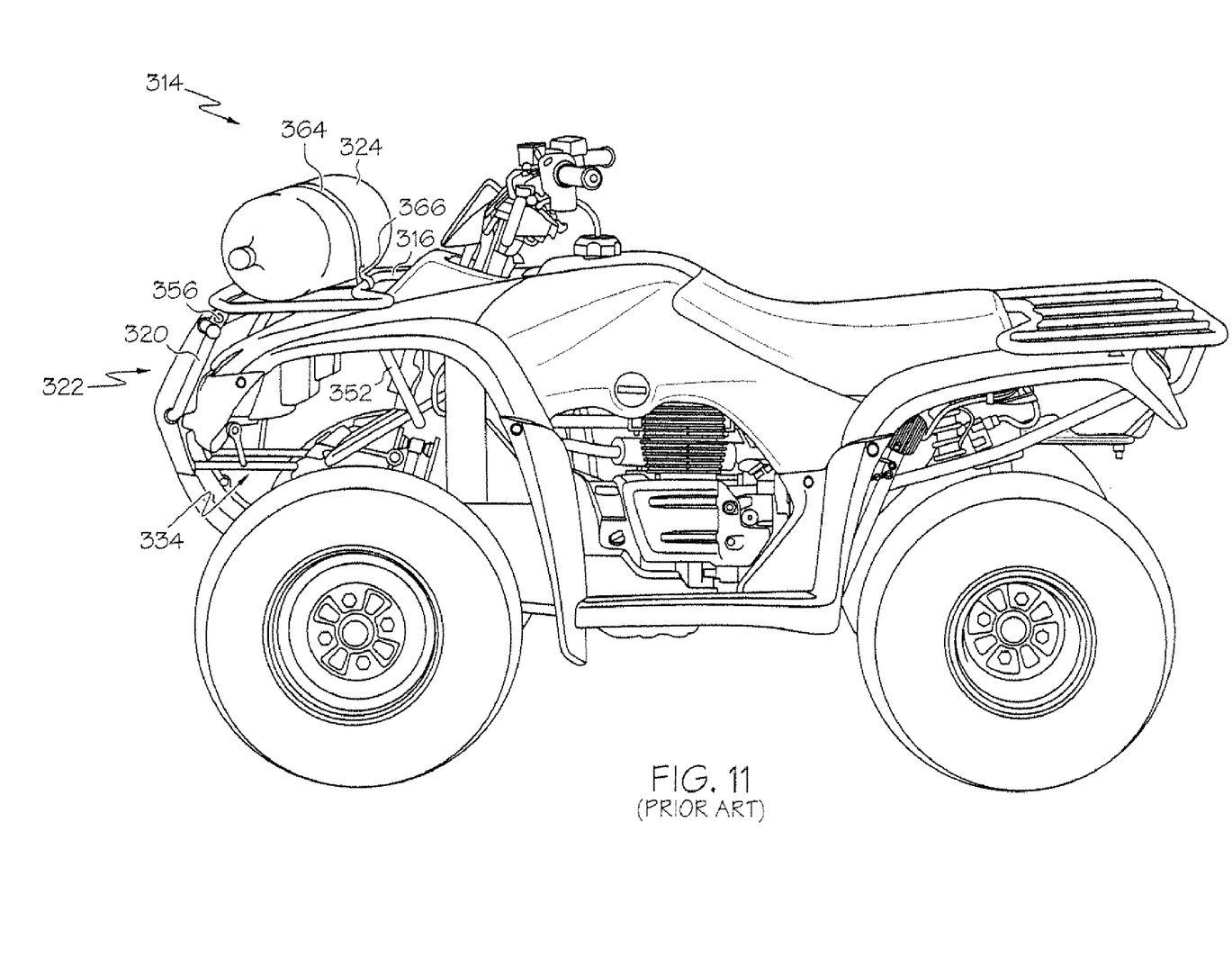
FIG. 11 is a side perspective view of the ATV of FIG. 10 wherein a water bottle is secured to the carrier rack.

FIG. 3 depicts how the blocking member 20, when in its second position, can be used to assist in supporting cargo upon the carrier rack 16. In particular, a water bottle 24 is shown to be supported upon the carrier rack 16, and is shown to be attached to the carrier rack 16 and to the blocking member 20 with a strap 64. The strap 64 can have a first end 66 which is attached to the carrier rack 16 and a second end 68 which is attached to the blocking member 20. By having the blocking member 20 to provide frontal support for the water bottle 24 as shown in FIG. 3, the water bottle 24 receives sufficient support (i.e.: from both the carrier rack 16 and the blocking member 20) so that the water bottle 24 is less likely to be jarred loose from the carrier rack 16 during travel of the ATV 14 than if the water bottle were secured to the carrier rack of a conventional ATV (e.g. as shown in FIGS. 10-11 and described below). A moveable guard assembly in accordance with the present invention can provide enhanced support in this manner for many different types of cargo including, but not limited to, camping equipment, hunting equipment, tools, and game. Furthermore, even when in the second position, the blocking member 20 can still provide a blocking function to protect at least part of the front end 22 of the ATV 14 and/or to protect cargo (e.g., from collision, brush or debris) which is supported upon the carrier rack 16.

Figure 4:
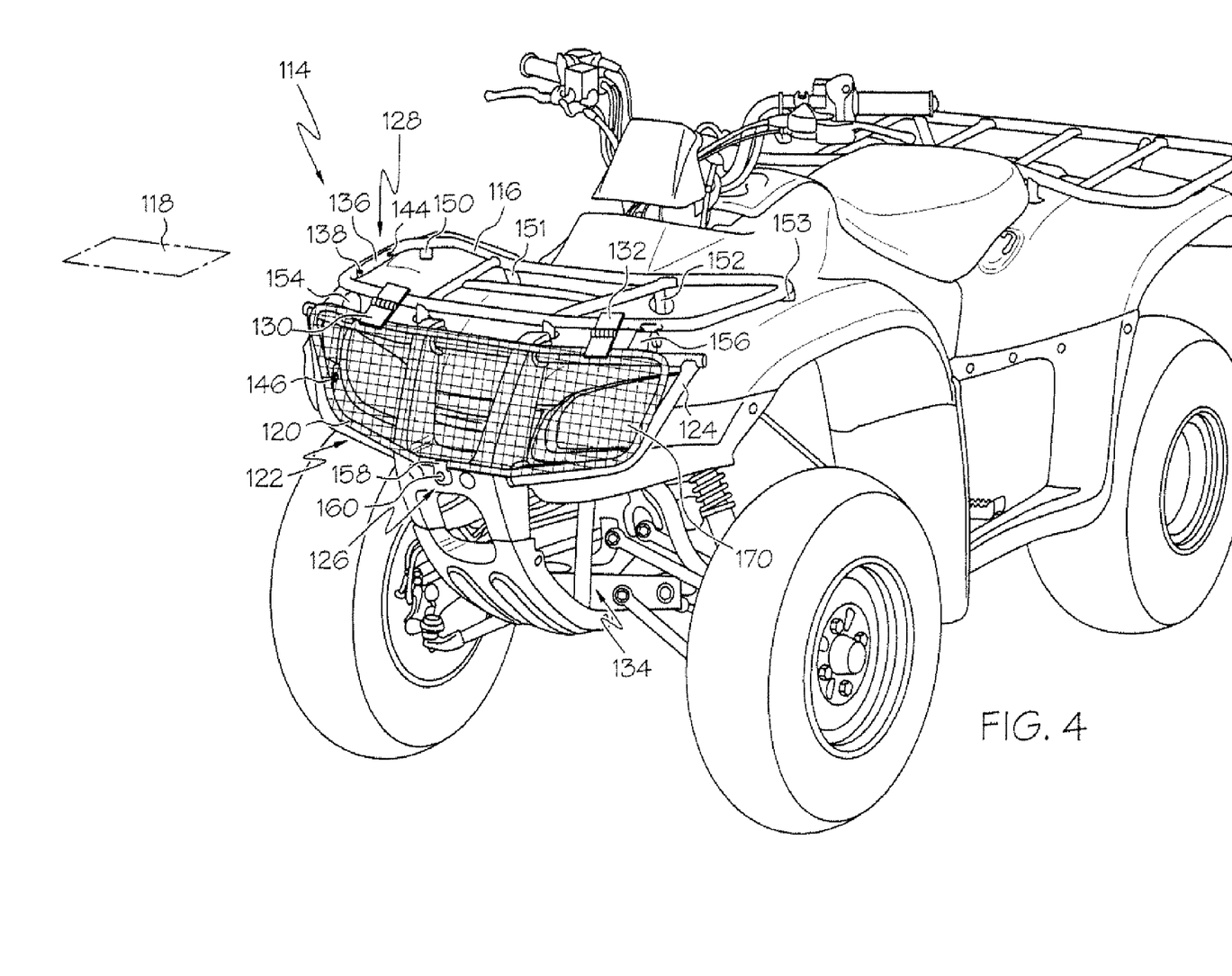
FIG. 4 is a front perspective view of an ATV having a moveable guard assembly in accordance with another embodiment of the present invention, wherein the blocking member is in a first position.
Figure 5:
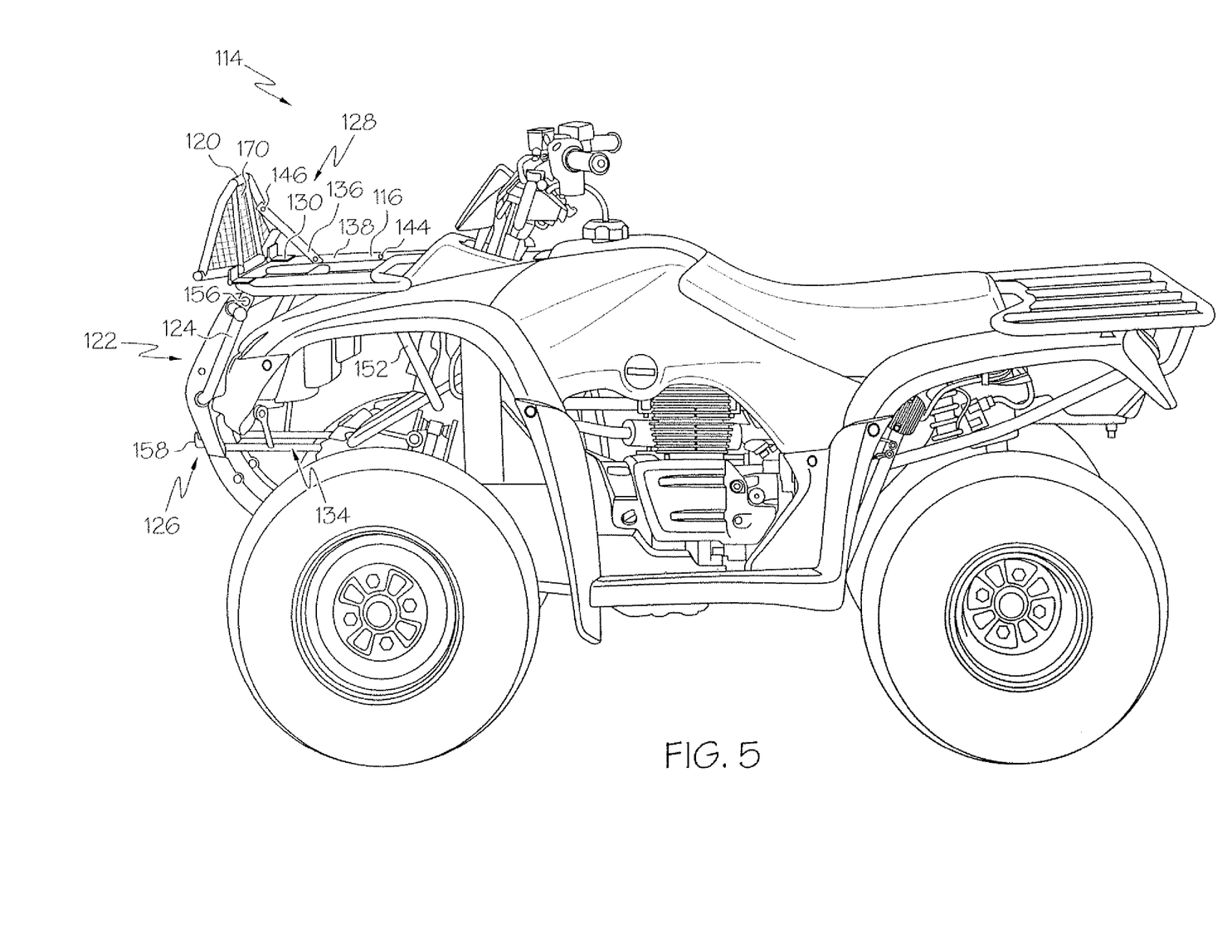
FIG. 5 is a side perspective view depicting the ATV of FIG. 4 wherein the blocking member is in a second position.

It will be appreciated that a moveable guard assembly in accordance with the present invention can be supported upon an ATV in any of a variety of specific configurations. For example, one alternative moveable guard assembly in accordance with the present invention is shown in FIGS. 4-5 on an ATV 114 and to include a carrier rack 116, a first blocking member 120 and a second blocking member 124, all of which are disposed adjacent to a front end 122 of the ATV 114. The carrier rack 116 defines a substantially horizontal plane configured for supporting cargo thereon, whereby this plane is generally represented by a coplanar plane 118 depicted in FIG. 4. The second blocking member 124 can be fixedly secured with respect to a frame 134 of the ATV 114 by way of a direct or indirect attachment to a frame 134 of the ATV 114. The carrier rack 116 is also shown to be fixedly secured with respect to the frame 134 through its attachment to the second blocking member 124 with brackets 154, 156, and through its direct or indirect attachment to the frame 134 through support posts 150, 151, 152 and 153.

The first blocking member 120 is shown to include a mesh 170 such as a screen or wire cloth, although it should be appreciated that the first blocking member 120 can alternatively be formed in any of a variety of other configurations. As with the other blocking members discussed herein, the mesh 170 can be configured to substantially prevent brush from passing therethrough. However, the mesh 170 may nevertheless be configured to allow passage of air and light, thereby imposing no significant aerodynamic effect upon the performance of the ATV 114 and avoiding any significant disruption of the light beams emitted from the headlights of the ATV 114 and/or with operator visibility of upcoming terrain.

The first blocking member 120 can be attached with hinges 130, 132 to the carrier rack 116 such that the first blocking member 120 is moveable between a first position, as shown in FIG. 4, and a second position, as shown in FIG. 5. In alternate embodiments, the first blocking member 120 can be hingedly attached to the second blocking member 124 and/or to another portion of the ATV 114. When in the first position, the first blocking member 120 can provide protection for the front end 122 of the ATV 114. While in the second position, the first blocking member 120 can provide additional support for cargo located upon the carrier rack 116. However, even when the first blocking member 120 is disposed in the second position, the second blocking member 124 may nevertheless provide at least some protection for the front end 122 of the ATV 114. Furthermore, even when the first blocking member 120 is disposed in the second position, the first blocking member 120 may provide at least some protection for the front end 122 of the ATV 114 and/or cargo supported by the carrier rack 116. As shown in FIGS. 4-5, the first blocking member 120, when in the first position, can be disposed such that it is substantially beneath the plane 118, and when in the second position, such that it is substantially above the plane 118. It will be appreciated that the first blocking member 120 can be configured such that it does not obscure an operator's visibility of approaching terrain, at least during which time the first blocking member 120 is in the first position. As further shown in FIGS. 4-5, the blocking member 120 can be oriented substantially vertically when in each of the first position and the second position.

Any of a variety of securement mechanisms can be provided to selectively retain the first blocking member 120 in at least one of the first and second positions. In particular, as shown in FIG. 4, a first securement mechanism 126 can be provided to selectively retain the blocking member 120 in the first position, and a second securement mechanism 128 can be provided to selectively retain the blocking member 120 in the second position. The first securement mechanism 126 can include a rotatable knob 158 which is secured by a bolt 160 with respect to the frame 134. The knob 158 can be rotatable so that, in one rotational position (as shown in FIG. 4), it secures the first blocking member 120 in the first position, while in another rotational position (not shown), the knob 158 allows release of the first blocking member 120 from the first position.

The second securement mechanism 128 is shown to include a strap 136, a bolt 138, and posts 144 and 146, and can be similar to the securement mechanism 28 described above with reference to FIG. 1. Accordingly, in a manner similar to that discussed of the securement mechanism 28 and blocking member 20 of FIGS. 1-3, the securement mechanism 128 can selectively maintain the first blocking member 120 in its second position. It will be appreciated that the second securement mechanism 128 might alternatively include multiple such straps which work together (e.g., in parallel) to selectively maintain the first blocking member 120 in the second position. However, it will also be appreciated that the first and/or second securement mechanisms could alternatively comprise any of a variety of other specific mechanical structures or configurations for selectively retaining the first blocking member 120 in the first and second positions, or that perhaps a single securement mechanism could be provided to selectively and alternatively secure the blocking member 120 in both the first and second positions.

Figure 6:
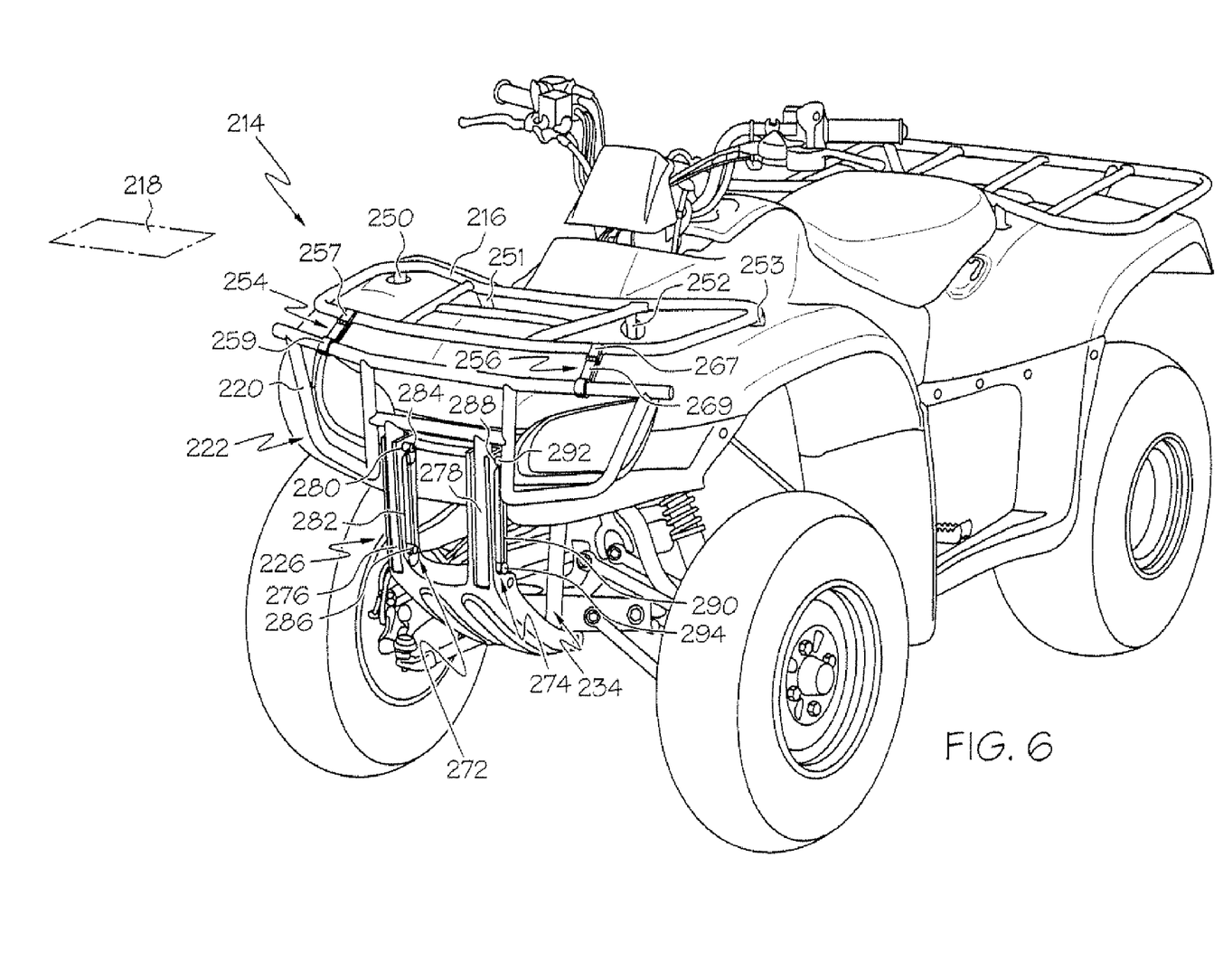
FIG. 6 is a front perspective view of an ATV having a moveable guard assembly in accordance with yet another embodiment of the present invention, wherein the blocking member is in a first position.
Figure 7:
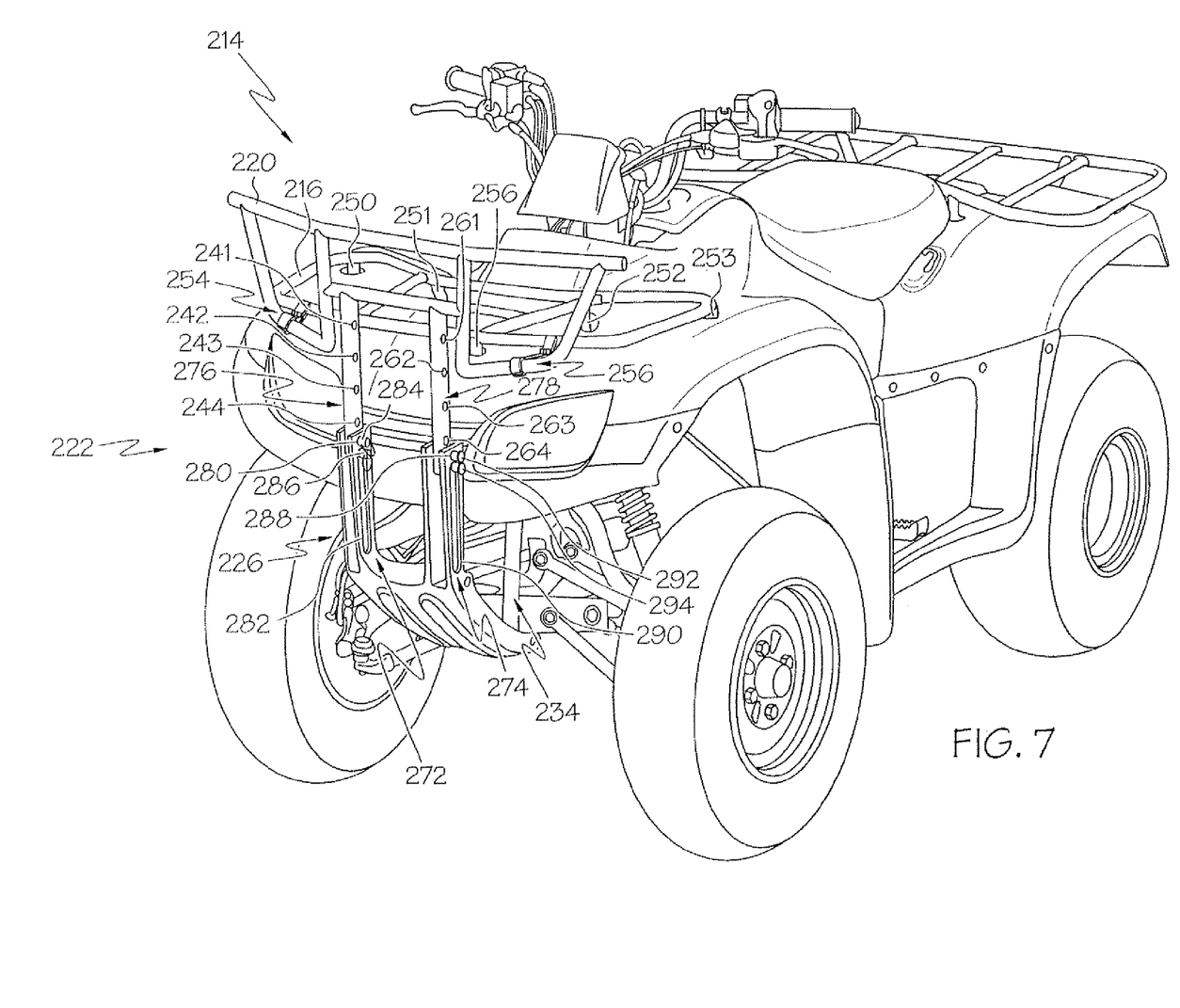
FIG. 7 is a front perspective view of the ATV of FIG. 6 wherein the blocking member is in a second position.
Figure 8:
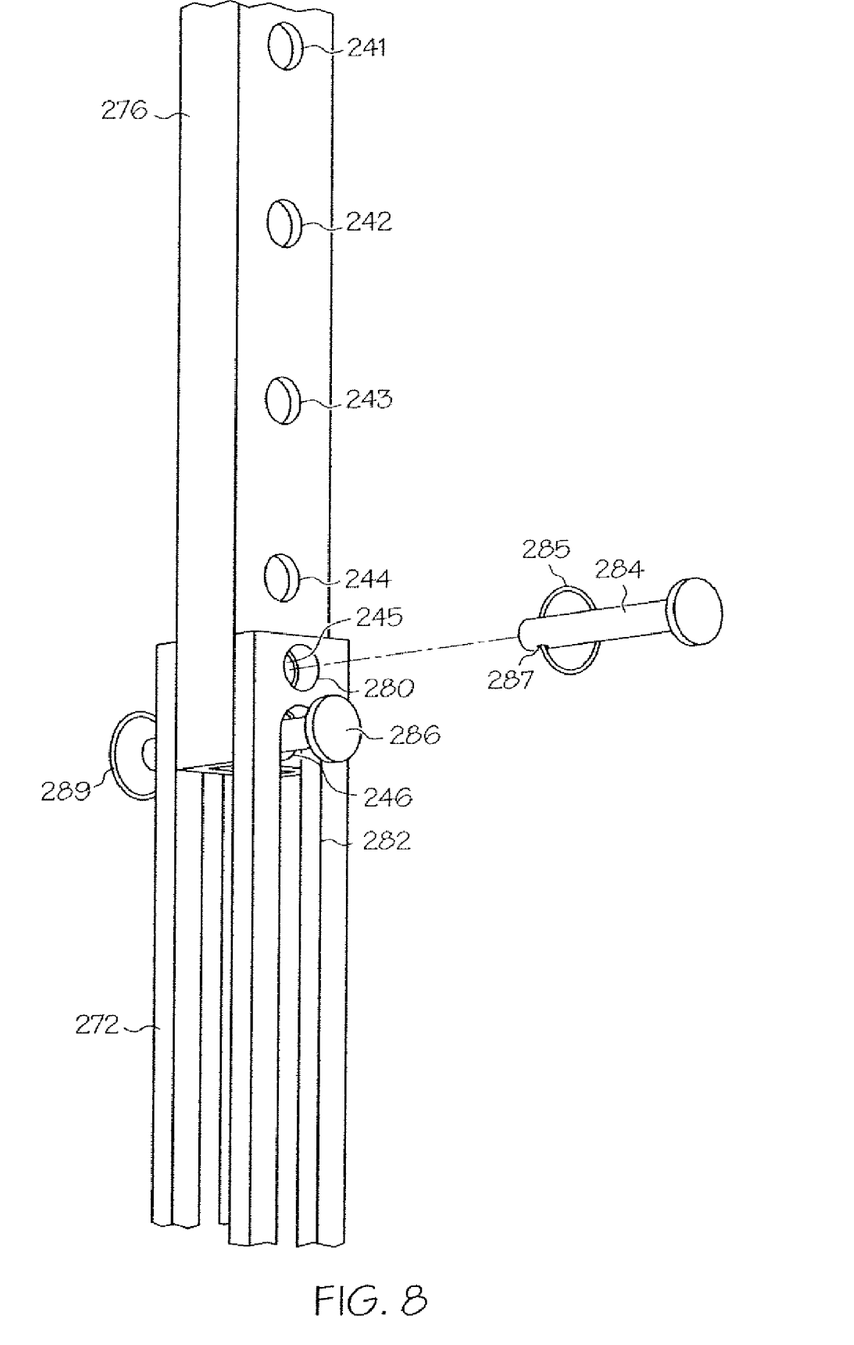
FIG. 8 is an enlarged front perspective view of a portion of the securement mechanism depicted in FIG. 7.

FIGS. 6-8 depict a movable guard assembly in accordance with yet another embodiment of the present invention. In particular, FIG. 6 depicts an ATV 214 which includes a carrier rack 216 that is attached to the ATV 214 adjacent to a front end 222 of the ATV 214. For example, the carrier rack 216 can be secured to a frame 234 of the ATV 214, such as with support posts 250, 251, 252, and 253. The carrier rack 216 generally defines a substantially horizontal plane which can be configured for supporting cargo thereon, and which is generally coplanar with a plane 218 depicted in FIG. 6.

A blocking member 220 can be attached to the ATV 214 at a location adjacent to the front end 222 of the ATV 214, and can be supported with respect to the frame 234. The blocking member 220 can be adjustable through vertically telescoping action between a first position and a second position. When in the first position, as shown in FIG. 6, the blocking member 220 can perform a guard function for protecting at least a portion of the front end 222 of the ATV 214. When in the second position, as shown in FIG. 7, the blocking member 220 can provide additional support for cargo placed upon the carrier rack 216. However, it will be appreciated that the blocking member 220, while in the second position, may provide some protection (e.g., from brush or collision) for the front end 222 of the ATV 214 and/or for cargo supported upon the carrier rack 216. As shown in FIGS. 6-7, the blocking member 220, when in the first position, can be disposed such that it is substantially beneath the plane 218, and when in the second position, such that it is substantially above the plane 218. It will be appreciated that the blocking member 220 can be configured such that it does not obscure an operator's visibility of approaching terrain, at least during which time the blocking member 220 is in the first position. As further shown in FIGS. 6-7, the blocking member 220 can be oriented substantially vertically when in each of the first position and the second position.

In addition to the support posts 250, 251, 252, and 253, one or more other support structures can be provided to secure the carrier rack 216 upon the ATV 214. For example, one or more clamps (e.g., 254, 256) can be provided so that the carrier rack 216 can selectively connect with the blocking member 220 and can thus be at least partially supported by the blocking member 220. In one particular embodiment, the clamps 254, 256 can have respective first portions 257, 267 which can be securely connected (e.g., through welding or fasteners) to the carrier rack 216. The clamps 254, 256 can also have respective second portions 259, 269 which can selectively interface the blocking member 220. In one embodiment, the second portions 259, 269 can comprise spring-loaded, scissor-type clamps which, under manual control of an operator of the ATV 214, can selectively grasp the blocking member 220 to secure the carrier rack 216 with respect to the blocking member 220. The second portions 259, 269 of the clamps 254, 256 can be selectively released from the blocking member 220 so that the blocking member 220 can be free to move between its first and second positions. However, once the blocking member 220 reaches its desired position, the second portions 259, 269 can again grasp the blocking member 220 to re-secure the carrier rack 216 with respect to the blocking member 220. In other embodiments, one or more clamps might additionally or alternatively be welded, bolted, or otherwise securely connected to the blocking member 220, but selectively releasable from the carrier rack 216. It will be appreciated that any of a variety of alternate mounting structures may be provided for selectively securing the carrier rack 216 to the blocking member 220 and/or some other portion of the ATV 214.

A securement mechanism can be provided to selectively and alternatively retain the blocking member 270 in the first position and the second position. In one particular embodiment, the securement mechanism 226 can include a first receptor 272 and a second receptor 274 which are both directly or indirectly attached to the frame 234 of the ATV 214. The securement mechanism 226 can further include a first vertical member 276 and a second vertical member 278 which are each attached to the blocking member 220. The vertical members 276, 278 can be configured to slidingly interface the respective receptors 272, 274. Through sliding engagement of the vertical members 276, 278 with the respective receptors 272, 274, the blocking member 220 can be raised and lowered vertically between first and second positions. In the first position, the blocking member 220 can protect at least part of the front end 222 of the ATV 214 (e.g., from brush or collision damage), while in the second position, the blocking member 220 can provide added support for cargo resting upon the carrier rack 216. While in the second position, it will be appreciated that the blocking member 220 may nevertheless provide some protection (e.g., from brush or collision) for the front end 222 and/or for cargo supported upon the carrier rack 216.

As shown in FIGS. 7 and 8, the first vertical member 276 can include multiple apertures (e.g., 241, 242, 243, 244, 245 and 246). Likewise, the second vertical member 278 can include a similar arrangement of apertures (e.g., 261, 262, 263 and 264). The first receptor 272 can include a first aperture 280 and a second aperture 282, and the second receptor 274 can also include a first aperture 288 and a second aperture 290. The second apertures 282 and 290 are shown to comprise elongated slots, although it will be appreciated that receptors in accordance with the present invention might alternatively be provided with differently configured second apertures, and/or with no first and/or second apertures whatsoever.

After insertion of the vertical members 276 and 278 into the respective receptors 272 and 274, a pin 286 can be inserted through the second aperture 282 in the first receptor 272, and then through the aperture 246 in the first vertical member 276. A pin 294 can then be inserted through the second aperture 290 in the second receptor 274, and then through an aperture in the second vertical member 278. The position of the blocking member 220 can then be vertically adjusted with respect to the receptors 272, 274, whereby the pins 286, 294 can correspondingly move vertically along the respective second apertures 282, 290. In this configuration, provided that at least one of the pins 286 and 294 are inserted as described above, the blocking member 220 can maintain contact with the remainder of the ATV 214 during the entire movement of the blocking member 220 between the first position and the second position.

Once the blocking member 220 is moved to the desired vertical position, a pin 284 can be inserted through the first aperture 280 in the first receptor 272, and into another aperture provided in the first vertical member 276 (e.g. aperture 245). A pin 292 can then be inserted through the first aperture 288 in the second receptor 274, and then into another aperture provided in the second vertical member 278. By insertion of the pins 284 and 292 in this manner, the vertical position of the blocking member 220 can thereby be maintained or locked until the pins 284 and 292 are removed. If desired by an operator, the blocking member 220 could be easily and completely removed from the ATV 214 upon mere removal of the pins 284, 286, 292 and 294. A plow, winch, cargo rack or other auxiliary implement could then be attached (e.g., with pins) to the receptors 272, 274 in lieu of the blocking member 220.

During normal use of the ATV 214, the pins 286 and 294 can remain in place. However, in order that the vertical height of the blocking member 220 can be adjusted, the pins 284, 292 can be selectively removed and inserted from and to appropriate apertures of the vertical members 276, 278 and receptors 272, 274 after those apertures are appropriately aligned (e.g., as shown in FIG. 8). For example, as shown in FIG. 6, the blocking member 220 is depicted in its first position, whereby the pin 284 passes through the first aperture 280 in the first receptor 272 and then through the aperture 241 in the first vertical member 276, and the pin 292 passes through the first aperture 288 in the second receptor 274 and then through the aperture 261 in the second vertical member 278. As shown in FIG. 7, wherein the blocking member 220 is depicted in the second position, the pin 284 can pass through the first aperture 280 of the first receptor 272 and then into the aperture 245 of the first vertical member 276, and the pin 292 can pass through the first aperture 288 in the second receptor 274, and then into a corresponding aperture in the second vertical member 278. The blocking member 220 could alternatively be retained in one or more other positions such as might be intermediately located between the first and second positions (e.g., through insertion of pin 284 through one of apertures 242, 243, and 244, and by insertion of pin 292 through a corresponding one of apertures 262, 263, and 264).

Pins 284, 286, 292 and 294 can comprise rollers, clevis pins, bolts, and/or any of a variety of other such components, and may or may not include bearings. Any of a variety of specific mechanical configurations may be used to assist in selectively restraining one or more of the pins 284, 286, 292 and 294 within the desired apertures. For example, as shown in FIG. 8, pin 284 can be provided with an aperture 287 for selectively receiving a locking ring 285, and pin 286 can similarly be configured for selectively receiving a locking ring 289. It will be appreciated that a vertically telescoping blocking member in accordance with the teachings of the present invention might include only a single vertical member and receptor pair, and/or might include greater than two such pairs. It will also be appreciated that a moveable brush guard in accordance with the teachings of the present invention can be slidingly attached to the front of an ATV in any of a variety of specific configurations, or might alternatively be moveably provided upon an ATV in a manner not involving hinges or telescoping action.

FIG. 10 depicts a conventional ATV 314 including a carrier rack 316 and a blocking member 320, both of which are disposed adjacent to a front end 322 of the ATV 314, and are attached to a frame 334 of the ATV 314. The carrier rack 316 is shown as being supported upon the ATV 314 by support posts 350, 351, 352 and 353, and brackets 354 and 356. While the support posts 350, 351, 352, and 353 can connect directly or indirectly with the frame 334, the brackets 354 and 356 can attach to the blocking member 320, which in turn can connect directly or indirectly with the frame 334. In this conventional configuration, the blocking member 320 is not movable with respect to the carrier rack 316, and thereby cannot assist in securing cargo to the carrier rack 316 as can a moveable brush guard made in accordance with the present invention.

For example, FIG. 11 depicts a water bottle 324 being attached to the carrier rack 316 with a strap 364. In particular, a first end 366 of the strap 364 is shown as being attached to the carrier rack 316, and the other end of the strap 364 can also attach to the carrier rack 316. Because the water bottle 324 is a substantially cylindrical object that is only supported on one side (by the carrier rack 316), it is more likely to become dislodged during travel of the ATV 314 over rough terrain than is a water bottle maintained by a similar strap configuration upon an ATV in accordance with the teachings of the present invention. Accordingly, as compared to this conventional configuration, a movable guard assembly in accordance with the teachings of the present invention can provide substantial assistance in restraining cargo to a carrier rack (as shown for example in FIG. 3), thereby often avoiding any need for multiple straps and/or a complex strap configuration.

The foregoing description of embodiments and examples of the invention has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate the principles of the invention and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. An all terrain vehicle comprising:
   a carrier rack supported at a location adjacent to a front end of the all terrain vehicle and defining a substantially horizontal plane configured for supporting cargo thereon; and
   a blocking member provided adjacent to the carrier rack, wherein the blocking member is adjustable through sliding movement between a first position in which the blocking member is operable to perform a guard function for protecting at least a portion of the front end of the all terrain vehicle, and a second position in which the blocking member is operable to provide additional support for cargo placed upon the carrier rack.

2. The all terrain vehicle of claim 1 wherein the blocking member, when in the first position, is disposed such that the blocking member is substantially beneath the plane, and the blocking member, when in the second position, is disposed such that the blocking member is substantially above the plane.

3. The all terrain vehicle of claim 1 further comprising a securement mechanism configured to selectively retain the blocking member in at least one of the first position and the second position.

4. The all terrain vehicle of claim 3 wherein the securement mechanism is configured to alternatively retain the blocking member in the first position and the second position.

5. The all terrain vehicle of claim 1 further comprising a receptor and a vertical member, one of the receptor and the vertical member being attached to the blocking member, and the vertical member configured to slidingly interface with the receptor such that the blocking member can be vertically adjusted between the first position and the second position.

6. The all terrain vehicle of claim 5 further comprising a frame, wherein the carrier rack and the other one of the receptor and the vertical member are attached to the frame.

7. The all terrain vehicle of claim 5 wherein the vertical member includes a first aperture and the receptor includes a second aperture, the first aperture and the second aperture being configured to align when the blocking member is in the first position.

8. The all terrain vehicle of claim 7 further comprising a removable pin being selectively insertable into the first aperture and the second aperture upon alignment of the first aperture with the second aperture to facilitate maintenance of the blocking member in the first position.

9. The all terrain vehicle of claim 5 wherein the vertical member includes a first aperture and the receptor includes a second aperture, the first aperture and the second aperture being configured to align when the blocking member is in the second position.

10. The all terrain vehicle of claim 9 further comprising a removable pin being selectively insertable into the first aperture and the second aperture upon alignment of the first aperture with the second aperture to facilitate maintenance of the blocking member in the second position.

11. An all terrain vehicle comprising:
a carrier rack supported at a location adjacent to a front end of the all terrain vehicle and defining a substantially horizontal plane configured for supporting cargo thereon; and
a blocking member provided adjacent to the carrier rack, wherein the blocking member is adjustable through movement between a first position in which the blocking member is operable to perform a guard function for protecting at least a portion of the front end of the all terrain vehicle disposed beneath the carrier rack, and a second position in which the blocking member is operable to provide additional support for cargo placed upon the carrier rack.

12. The all terrain vehicle of claim 11 wherein the blocking member, when in the first position, is operable to perform a brush guard function.

13. The all terrain vehicle of claim 11 wherein the blocking member is configured to maintain contact with the all terrain vehicle during the entire movement of the blocking member between the first position and the second position.

14. The all terrain vehicle of claim 13 wherein the blocking member is configured to be adjustable through one of vertically telescoping action and hinged movement.

* * * * *

UNITED STATES PATENT AND TRADEMARK OFFICE
CERTIFICATE OF CORRECTION

PATENT NO. : 7,513,545 B2
APPLICATION NO. : 11/945824
DATED : April 7, 2009
INVENTOR(S) : Rowdy L. Joseph et al.

It is certified that error appears in the above-identified patent and that said Letters Patent is hereby corrected as shown below:

Column 1, line 8, change "October 11 2005" to --October 11, 2005--.

Column 1, line 45, insert --.-- immediately following "thereon".

Column 4, line 11, change "wail" to --wall--.

Column 8, line 13, change "270" to --220--.

Signed and Sealed this

Seventh Day of July, 2009

JOHN DOLL
*Acting Director of the United States Patent and Trademark Office*